Jan. 27, 1942. A. C. GONZALEZ Re. 22,013
MEANS FOR JOINING CONSTRUCTIONAL MEMBERS
Original Filed Oct. 25, 1938 2 Sheets-Sheet 1
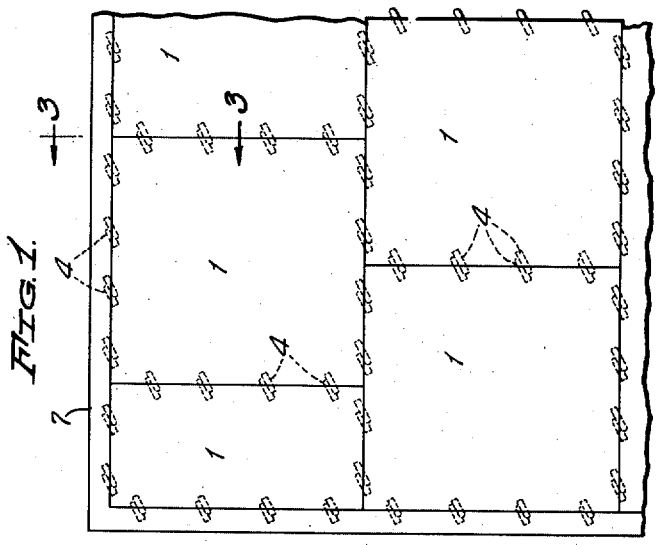
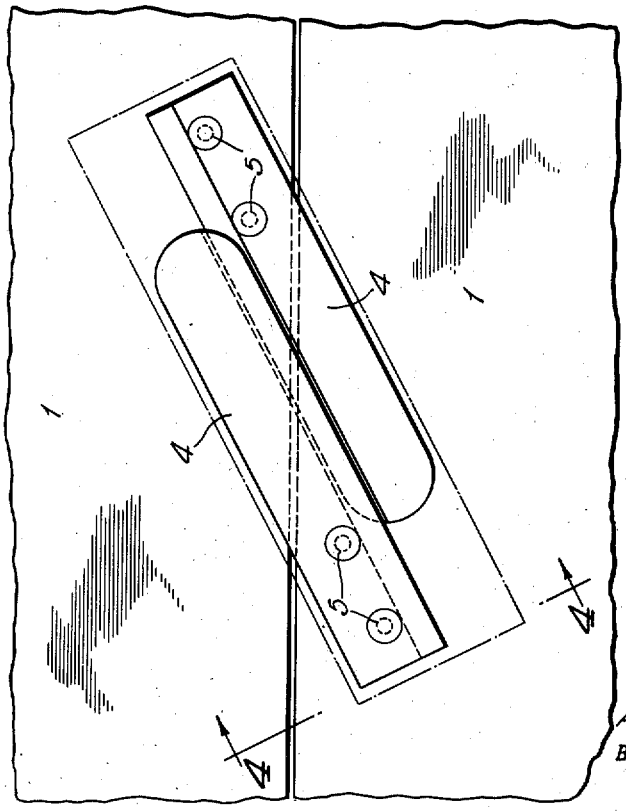
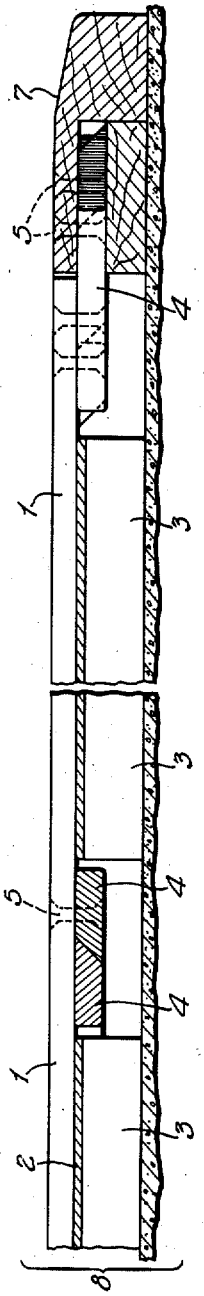
INVENTOR.
AUGUSTO C. GONZALEZ.
BY Knight Bros
ATTORNEYS.

Jan. 27, 1942. A. C. GONZALEZ Re. 22,013

MEANS FOR JOINING CONSTRUCTIONAL MEMBERS

Original Filed Oct. 25, 1938 2 Sheets-Sheet 2

INVENTOR.
AUGUSTO C. GONZALEZ.
BY Knight Bros
ATTORNEYS.

Reissued Jan. 27, 1942 Re. 22,013

UNITED STATES PATENT OFFICE 22,013

MEANS FOR JOINING CONSTRUCTIONAL MEMBERS

Augusto C. Gonzalez, Manila, P. I.

Original No. 2,231,385, dated February 11, 1941, Serial No. 236,888, October 25, 1938. Application for reissue August 30, 1941, Serial No. 409,052

7 Claims. (Cl. 20—15)

My invention relates primarily to an improvement on the original floor device shown in my U. S. Patent No. 2,085,215, but it has, as will appear, application to other devices having two members designed to be held tightly together. In the floor structure of that patent, the floor may, if desired, be assembled in sections independent of the foundation or sub-floor, and when laid will have the quietness and resiliency of a carpet, and have a wearing surface having the hardness and sanitary properties of a washable type of hard floor. My improved floor comprises wearing surface members of suitable hard material, such as plywood, compressed wood, metal, marble, tiles or synthetic compositions, assembled so as to cover the entire wearing surface of the floor or section thereof; flat resilient members cemented or glued to the undersurface of the wear members, and composed of any resilient material, such as felt or insulation board, the dimensions and arrangement of the resilient members being the same as those of the wear surface members. In such a floor structure it is important that the edges of the individual floor sections be capable of being laid down individually, or in assembled, part-floor, groups, and be adjustable toward each other to bring their contiguous edges into close contact and so bind them together as to make in effect a unitary structure, as to its wear surface. To this end I provide latches or fastening strips of metal, or the like, riveted or otherwise fastened between the wear surface and the resilient members so as to permit the free compression of said resilient members at their edges, when the floor members or sections are locked into or fastened to each other. These floor members, or sections comprising a plurality thereof, are laid upon the foundation or sub-floor of cement or other suitable construction, the latter being first preferably rendered water or moist-proof by any suitable water-proofing composition.

The invention also comprises other features which will be more fully described in the following specification, and set out in the claims.

In the accompanying drawings which illustrate one embodiment of my invention by way of example.

Fig. 1 is a plan view of a portion of a floor constructed in accordance with my invention, and Fig. 2 is a top view of a portion thereof to a larger scale.

Fig. 3 is a sectional view also to an enlarged scale of two floor sections taken on line 3—3 of Fig. 1.

Other uses for the "interlock latches" are shown in Figs. 4, 5, 6 and 7.

Figure 4:
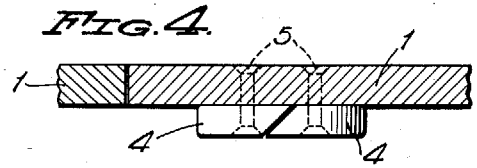

Fig. 4 is a vertical section substantially on the line 4—4 of Fig. 2, with the resilient slab underneath removed.

Figure 5:
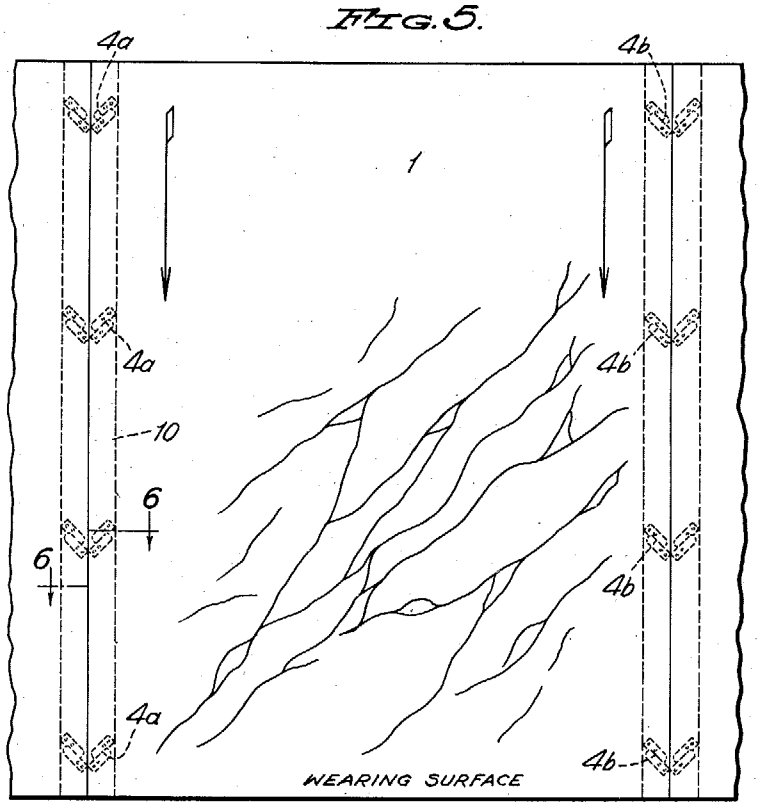
Figure 6:
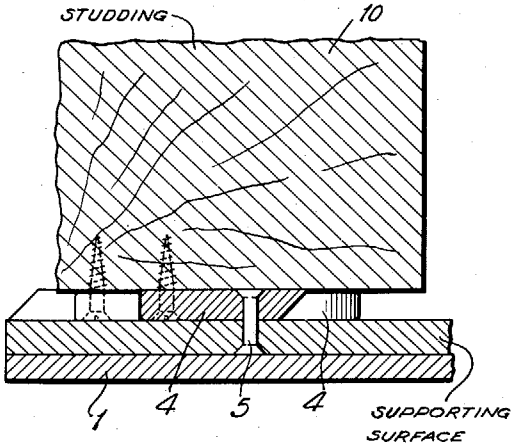

Figs. 5 and 6 show the manner in which the interlocking latches can be used for mounting panels on studding, Fig. 5 being a front elevation and Fig. 6 a section on the line 6—6 of Fig. 5.

Figure 7:
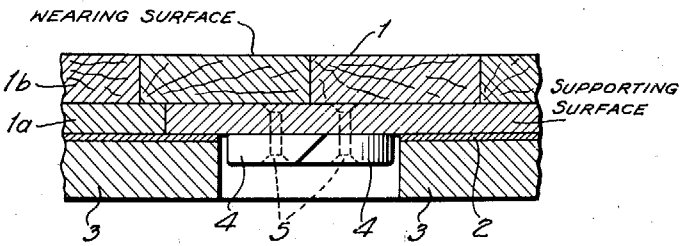

Fig. 7 is a sectional view similar to the left side of Fig. 3, showing a wood-parquetry wear surface, the section being on a line substantially the same as the line 4—4 of Fig. 2.

In the form of the invention shown, in Figs. 1 to 4, 1 is the wearing surface member made up in slabs of sections; 2 mastic cement for joining the slabs or sections, or a member made up of several such slabs or sections, to a resilient member 3 underlying the wear surfaces 1. 4 are interlocked latches and 5 rivets for fastening the latches to the floor slabs. 6 is the sub-floor over which the resilient floor material 3, if used, is spread. 7 is a locking border plate serving as retaining border for the floor. 8 indicates the assembled floor section unit carried by foundation floor 6.

In the application of my invention to a wall structure, the same construction as that described for the floor may be used or it may be as exhibited in Figs. 5 and 6, in which a vertical series of the interlocking latches 4 are fastened alternately to the edge of a wall panel or section 1 and to a supporting beam or post, as for example the studding 10, the latches on the panels and studding being in the same plane when the panel is applied to the studding. The assembly is such that the downward drift of the wall panels will cause their edges to be strained together by the wedging action of the latches, while the beveled form of the meeting faces of the latches will cause the bringing of the several panels or sections to a common plane under the weight of the panels. It will be observed that the pairs of clips which support each panel are arranged in two sets, 4*a* and 4*b*. The mutually engaging edges of all of the pairs of clips of the set 4*a* are parallel to each other, and the same is true of the mutually engaging edges of the pairs of clips in the set 4*b*; but the mutually engaging edges in the set 4*a* are at an angle to those of the set 4*b*. The angle is such that all of the clips secured to the panel can be interlocked with the complementary clips on the studs 10 by a short downward movement of the panel. When interlocked, the clips oppose movement of the panel in relation to the studs in all horizontal or downward directions.

The floor device comprises the sheets or sections 1 of suitable hard and durable wearing material or a plurality of materials such as wood, metal, marble, or synthetic composition, closely assembled over the entire surface of the floor. Preferably, however, for convenience and rapid handling these wear surfaces are assembled in sections, each section being made up of a plurality of sheets 1 closely assembled as shown in Fig. 1. Immediately underlying the wear surfaces 1 are sheets or strips 3 of resilient material, such as felt or insulation board, the horizontal dimensions of the sheets 3 being the same as those of sheets 1 of the wear surfaces. The members 1 and 3 are fastened together by any suitable mastic cement or glue 2 which is applied to one or both of the contacting surfaces, and the members 1 and 3 are thereupon preferably pressed together so as to make a firm union between them, and form a united floor section 8.

The members 1 are fastened together and held level by means of interlocking bevelled latches 4 of non-corrosive metal or the like, riveted at 5 or otherwise fastened through the members 1, the holes therefor in the members 1 being preferably countersunk. Thus the wear surface of each section 8, is locked and held as a single unit by interlocking the latches 4, protruding out and at an angle from around the four sides of each floor section 8. The resilient members 3 are permitted to yield under weight as a cushion, vertical movement thus being allowed to the floor. The entire floor is preferably built up by combining a number of the members 1 and 3 to form integral sections 8, of convenient size, which are then assembled upon the foundation or sub-floor 6, after a suitable water or moisture-proof coat has been applied to the sub-floor. The sections 8, are fastened together and securely held in place after laying, by the countersunk locking latches in border 7, holding the contiguous sides of the adjacent sections 8.

The cement or other sub-floor 6 is preferably smoothly surfaced, though slight irregularities in surface will not be detrimental to the proper operation of the floor.

In Fig. 7, I show a floor section comprising a layer $1^a$ of closely assembled slabs of suitable hard surface material, supporting tiles, mosaic or parquet designs $1^b$ made of any suitable product, cemented onto said hard surface material $1^a$ and forming together the wear surface 1. A layer of slabs 3 of resilient material individually underlies and is cemented to the supporting slabs $1^a$ of hard surface material and is of horizontal dimensions similar to the wear surface slabs. In this instance also, interlocking latches or clips 4 protrude out from the edges of all four sides of the slabs so as to lock into the latches or clips overhanging the edges of the adjacent slabs.

I claim:

1. Means for connecting together the parts of buildings and other structures at their meeting edges, comprising like parallel bars, fastened in pairs of contact with each other, and in the same plane, to different adjacent members of the structure at approximately equal angles, with the two bars of each pair extending diagonally to the meeting edges of the members to which they are secured, the bars being bevelled to effect strain normal to the surface of the structure in addition to that effected in the plane thereof.

2. A building or like structure having a wall comprising studding and separate panels or sections, held to the studding with their edges in contact by latches in the form of paired bars lying in the same plane, fastened diagonally of the edges of the panels, alternately to a stud and to a panel, in which the latches on adjacent panels and the latches on the studding paired therewith are at reverse angles, converging downwardly.

3. A building structure, comprising two panels contacting at their edges to form parts of a plane surface, as of a wall or floor, and a pair of rigid bars, mounted on the structure in one plane parallel to the plane of the panels, parallel to each other and contacting with each other in a line oblique to the contacting edges of the panels, so that said edges engage with a shearing action.

4. A building structure as set forth in claim 3, comprising a plurality of pairs of rigid bars, each pair constructed and mounted as therein set forth.

5. A building structure as set forth in claim 3, in which each of the two panels has mounted upon it one member of the pair of bars.

6. A building structure as set forth in claim 3, in which each of the two panels has so mounted upon it one member of the pair of bars that the bars extend in opposite directions across the meeting edges of the panels.

7. Means for connecting together two parts of a building or other structure, comprising a plurality of pairs of plate-like clips, the two clips of each pair being respectively secured flat against parallel surfaces of the respective parts to be connected together and positioned so as to engage each other edgeways, the engaging edges of the pairs of clips being bevelled so as to interlock against stresses normal to the surfaces to which they are fixed, said pairs of clips being arranged in two sets, the mutually engaging edges of all the pairs of clips in one of the sets being parallel to each other, and the mutually engaging edges of all the pairs of clips in the other set also being parallel to each other, but at an angle to the mutually engaging edges of the pairs of clips in the first set, the angle being such that one of the parts to be connected together can be moved in a straight line to engage and interlock all its clips with the complementary clips on the other part.

AUGUSTO C. GONZALEZ.